United States Patent Office 3,549,562
Patented Dec. 22, 1970

3,549,562
PRODUCTION OF ION EXCHANGE RESIN
PARTICLES
Morris Mindick, Chicago, and Jerry J. Svarz, La Grange, Ill., assignors, by mesne assignments, to The Dow Chemical Company, a corporation of Delaware
No Drawing. Continuation of application Ser. No. 691,541, Oct. 22, 1957. This application June 14, 1965, Ser. No. 463,923
Int. Cl. C08f 27/08
U.S. Cl. 260—2.1                                16 Claims The present application is a continuation of application Ser. No. 691,541, which application was filed on Oct. 22, 1957 and now abandoned.

This invention relates to a process for the production of ion exchange resin particles having improved physical properties. More particularly, the invention provides an improved process that results in resin particles which undergo low volume changes in use while having the desired porosity or water holding capacity and good strength.

In the production of ion exchange resin particles having the desired water holding capacity, an important problem concerns the production of resin particles which are not subject to excessive swelling and shrinking in use under ion exchanging conditions. These volume changes are caused by exchange of ions in the resin particles or beads, and the changes in ionic concentration around the particles. Excessive volume changes will rupture the resin particles. Also, when confined resin particles expand against the walls of the container, the compressive stresses may shatter the particles. Excessive expansion also may cause excessive pressure drop through a column of the particles, or blockage or channeling. The stresses caused by repeated excessive swelling and shrinking reduce the useful life of the resin particles.

The invention has for its object the provision of a process which results in the production of ion exchange resin particles characterized by low swelling and shrinking in use. At the same time, it is an object to provide resin particles which have the desired water holding capacity, preferably high capacity, which are hard and strong, and which have the other properties desired for good ion exchange resin particles.

It has now been discovered in the invention that the above and other objects are achieved by copolymerizing a monovinyl aromatic monomer and a polyvinyl aromatic monomer in a relatively high minimum proportion of the latter, and polymerizing the monomers in aqueous dispersion in the presence of a quantity of an organic liquid solvent for the monomers. More particularly, as described in greater detail subsequently, it is necessary to employ certain proportions of the monomers and a certain proportion of the organic solvent in order to produce ultimately resin particles which undergo low volume changes while having the desired water holding capacity and other properties. The copolymeric particulate resin prepared in this manner is converted to an ion exchange resin having the desired properties. The advantages of the invention are pronounced when the copolymer is converted to an anion exchange resin.

It is especially desirable to produce ion exchange resin particles which exhibit a maximum swelling when converted from the chloride form to the hydroxide form, of about 30%, above which value the resin particles rupture to an undesirable extent. In the invention, a process is provided by which the swelling can be maintained below 30%. Employing the preferred conditions, the swelling is maintained below 25%, which constitutes an especially important achievement. A further condition is that the shrinkage of the chloride form of the resin in 1 Normal sodium chloride solution be not greater than 10%, for long useful life of the resin particles. The invention now provides a process which results in very advantageous resin particles having a maximum shrinkage of 5%. Reference herein to percent swelling refers to the increase in volume in percent based upon the volume of the starting material, which results when the ion exchange resin in the chloride form is converted to the hydroxide form by passing an aqueous solution of sodium hydroxide (it may be a 2 to 10% solution) through the resin until regeneration in the hydroxide form is complete, followed by washing with deionized water until the sodium hydroxide solution is completely displaced. Reference herein to percent shrinkage refers to the decrease in volume based upon the volume of the starting material, of the chloride form of the resin when it is immersed in 1 Normal aqueous NaCl solution until the particles have ceased to shrink.

In determining the swelling and shrinking values, it has been found that while each value may vary somewhat from cycle to cycle of use, the sum of these values, which is termed the "compression," remains fairly constant, so that this sum is a reliable guide to the volume change properties of a resin. An additional condition is that the compression be not greater than 40% and the invention provides very desirable superior resins having a compression maximum of 30%.

It has been discovered that in order to achieve the production of resin particles within the foregoing volume change limits, it is necessary to copolymerize a relatively high proportion of polyvinyl aromatic compound with the monovinyl aromatic compound, which proportion is generally a minimum of 16% of the polyvinyl compound, but at times may be lowered to 12%. These proportions have reference to the proportion by weight of polyvinyl compound in the mixture of polyvinyl and monovinyl compound. In order to produce the especially desired anion exchange resin particles which swell less than 25%, a polyvinyl compound proportion of about 20% to 32% has been found necessary. The maximum practicable limit of polyvinyl compound appears to be about 50% of the monomer mixture, and it is preferred to employ a maximum proportion of the polyvinyl compound of about 40%.

Proportions of the monomers of the above order have been referred to previously in the literature. However, the commercial anion exchange resins are produced employing substantially lower proportions of polyvinyl compound or cross-linking agent. It was previously noted that relatively high proportions of the polyvinyl compound produced a dense or relatively nonporous ion exchange resin exhibiting impractically low ion exchange rates and inability to handle or remove certain ions, such as those of trace organic acids.

It has further been found in the invention that the desired water holding capacity or porosity is achieved at the same time as the volume changes are reduced in the above manner, by polymerizing the monomers in the presence of certain proportions of a water-immiscible organic liquid solvent for the monomers. In this manner, the desired high water holding capacity resins are produced while overcoming the problem of physical stability of other resins having high water holding capacities, in particular, of 55% to 62%.

Ion exchange resin particles having water holding capacities of about 40% to 65% are readily prepared in the invention. By "water holding capacity" is meant the proportion of water which will be taken up by or held within the resin particles, and it is a measure of the porosity.

It is expressed herein in percent by weight based upon the weight of the wet resin particles.

Resin particles having a water holding capacity of as low as about 40% may be desired for certain applications, and they may be produced by suitably adjusting the conditions. In general, water holding capacities of 50% to 65% are sought. In commercial use of anion exchange resin particles, it is sought to provide what are termed porous resin particles, which have a water holding capacity of about 55% to 62%.

The foregoing water holding capacities result from proper selection of the solvent proportion according to the invention. The solvent proportion is expressed herein in percent by weight of the total quantity of monomers plus solvent. It may be as low as about 30% for the low water holding capacity resins, having in the neighborhood of 40 to 45% water holding capacity. In order to produce resin particles having water holding capacities of at least about 50%, the necessary solvent proportion has been found to be comparable, at least about 50%. For producing the commercially sought resins having water holding capacities of 55% to 62%, a solvent proportion of about 55% to 65% is required. It is ordinarily preferred to limit the solvent proportion to a maximum of about 70%. In connection with these conditions and the above conditions for regulating the volume changes, it has been found that the type of solvent influences the volume change and the water holding capacity to some extent, so that adjustment may be required with changes in the type of solvent.

The organic solvent is preferably a swelling agent for the polymer which does not dissolve the polymer. It is inert, that is, it does not react with the monomers, the polymers, or the suspending medium. It is preferred that the solvent have a boiling point greater than about 60° C. Aromatic and aliphatic hydrocarbons and halogenated hydrocarbons may be employed. The preferred solvents are benzenoid compounds, further preferably, benzene and halo- and lower alkyl-substituted derivatives. Solvent mixtures may be employed. Exemplary solvents of the foregoing types are benzene, toluene, xylene, chlorobenzene, bromobenzene, ethylene dichloride, and ethylene dibromide. Toluene is the preferred solvent.

It has also previously been proposed to produce granular ion exchange particles by polymerizing a solution of the monomers in a solvent which is immiscible with the suspending liquid. However, so far as is known, it had not previously been discovered that by properly combining the conditions of cross-linking and solvent proportions, ion exchange resin particles could be produced which would be characterized by low volume changes in use together with high water holding capacity, as well as possessing the other desired properties, thus solving the prior problems.

The invention is particularly concerned with the production of the class of anion exchange resins which are the reaction products of ammonia or amines with a vinyl aromatic resin having haloalkyl groups attached to the aromatic nuclei in the resin. In the first operation in the production of the exchange resins, vinyl aromatic resins are produced employing the conditions described above, which resins are normally solid benzene-insoluble copolymers of monovinyl aromatic monomers and polyvinyl aromatic comonomers.

The monovinyl-aromatic compounds are preferably selected from the benzene and naphthalene series, i.e., they contain not more than 10 carbon atoms in the aromatic nucleus, which monovinyl-aromatic compounds may contain in addition to the vinyl radical, from 1 to 3 halogen or lower alkyl radicals other than a tertiary alkyl radical, attached to the aromatic nucleus. The alkyl substituents are preferably methyl radicals. Examples of such monovinyl-aromatic compounds are styrene, methylstyrene, dimethylstyrene, ethylvinylbenzene, chlorostyrene, vinylnaphthalene, methyl - vinylnaphthalene, sec. - butyl-styrene and trimethylstyrene. The polyvinylaromatic compounds are selected from the benzene and naphthalene series in the same manner. Examples of polyvinyl-aromatic compounds are divinylbenzene, divinyltoluene, divinylxylene, divinylnaphthalene and divinylethylbenzene.

The monovinyl and polyvinyl aromatic compounds are further preferably benzenoid compounds, that is, those structurally related to benzene and including, for example, the monovinyl and polyvinyl compounds of benzene, alkylbenzene, halobenzene and the like, the substituents on the benzene ring being inert in the polymerization and subsequent reactions in the production of ion exchange resins.

The copolymers are prepared in the presence of an aqueous dispersion medium for the monomers, by the use of heat, light, or heat and light, in the presence or absence of a polymerization catalyst and at atmospheric, subatmospheric or superatmospheric pressure. The polymerization may take place in the conventional manner, except for the additional condition of the incorporation in the medium of an organic solvent for the monomers in the manner and in the proportions set forth above. The solvent is preferably incorporated in the medium together with the monomers, with the latter in solution in the solvent.

The volume changes in the ion exchange resin are primarily a function of the degree of cross-linking, volume changes decreasing with increasing cross-linking, and the volume changes may vary with the solvent proportion. The water holding capacity is primarily a function of the solvent proportion, increasing with increasing solvent proportion, and it will also generally decrease with increasing amount of cross-linking or polyvinyl compound. In this manner, the proportions of the materials in the polymerization medium are adjusted to provide the desired water holding capacity while producing resin particles which undergo low volume changes.

Suitable catalysts for effecting polymerization of the monomers are the peroxides such as benzoyl peroxide, lauroyl peroxide, hydrogen peroxide, etc. Per-compounds such as potassium persulfate, sodium perborate, and ammonium persulfate may also be employed as polymerization catalysts.

The polymerization reaction is preferably carried out in aqueous dispersion, at temperatures of from 75° to 100° C., employing a peroxide, e.g., benzoyl peroxide, as catalyst. Usually, a protective colloid such as starch, sodium cellulose glycolate, hydroxyethylcellulose, methylcellulose, etc., in amounts corresponding to from 0.01 to 0.5 percent by weight of the monomers used, is added to the aqueous dispersion to aid in maintaining the monomers dispersed as droplets while polymerizing the same to solid hard granules or beads. The beads are commonly obtained in particle sizes ranging in large part from 5 to 325 mesh. The polymerization is conducted to substantial completion, producing a resin polymer having a molecular weight of, e.g., about 50,000 or greater.

The copolymer is separated from the aqueous dispersion and may be washed with another solvent to assist in removing the immiscible solvent. It may then be washed with water and dried, for example, in a current of hot air or by other usual methods. It is preferred to remove the solvent substantially completely prior to the succeeding reaction.

The copolymers are normally solid benzene-insoluble vinyl-aromatic resins. By reacting the resins with at least a stoichiometric quantity, and preferably an excess, of a haloalkylating, preferably halomethylating agent such as chloromethyl methyl ether or bromomethyl methyl ether in the presence of a Friedel-Crafts type catalyst such as the preferred aluminum chloride, or zinc chloride, zinc oxide, stannic chloride, tin, zinc, iron, etc., halomethyl radicals may be introduced into the nuclei of the resin.

The halomethylation reaction, which occurs readily at temperatures in the range of from −10° to 120° C., or higher, is carried out while the copolymer is swollen by, or dispersed in, an organic liquid, e.g., tetrachloroethylene or chlorobenzene, which liquid is less reactive with the halomethylating agent over the stoichiometric quantity for the desired amount of substitution. About 0.1 to 2 mols of catalyst, preferably 0.5 to 1.5 mols, are employed per mol of copolymer (calculated on the average molecular weight of the monomers). The reaction is advantageously carried to a point at which the resin product contains an average of at least one halomethyl radical per five aromatic nuclei and is usually continued until the product contains an average of from 0.8 to 1.2 halomethyl groups per aromatic nucleus.

It has also been discovered that the volume changes in the ion exchange resin are further reduced when halomethylation is conducted at reflux temperature. Although reflux by itself does not cause marked reduction in swelling, it does so when using the polymer bead prepared by this invention and thus reduces the quantity of divinylbenzene required to achieve a given swelling. In addition, a hard bead of rigid structure is produced, and maximum ion capacity results. The physical properties and the ion capacity of the resin are best when the halomethylation is conducted in the sole presence of an excess of the halomethylating agent, with no other solvent or diluent.

After completing the halomethylation reaction, the resin is separated, e.g., by filtration, and washed with water, or preferably is washed successively with an organic liquid such as acetone or ethyl alcohol and then washed with water. The halomethylated resin can be used directly in wet condition or in dried condition, as an agent for preparation of the anion exchange resins.

The haloalkylated resins thus obtained are, therefore, water and benzene-insoluble, aromatic, cross-linked vinyl copolymers containing nuclear substituent groups having the general formula —$C_nH_{2n}$—X wherein X is halogen, preferably chlorine or bromine, and $n$ is an integer of preferably 1 to 4.

Haloalkylated resins are reacted with ammonia or primary, secondary, or tertiary amines to produce the insoluble anion exchange resins. Weakly basic resins are prepared from ammonia and the primary and secondary amines. Examples of such amines are methylamine, dimethylamine, N-butylamine, dibutylamine, isobutylamine, aniline, benzidines, toluidines, xylidines, alpha and beta naphthalene amines, naphthalene diamines, benzylamine, dibenzylamine, ethylenediamine, cyclohexylamine, dicyclohexylamine, diethylenetriamine, triethylenetetramine, tetraethylenepentamine, propylenediamine, dipropylenetriamine, and homologues thereof.

A preferred class of anion exchange resins constitutes the strongly basic quaternary ammonium resins, produced by reacting tertiary amines with the haloalkylated resins. Examples of suitable tertiary amines are trimethylamine, triethylamine, tributylamine, dimethyl propanolamine, dimethyl ethanolamine, methyl diethanolamine, 1-dimethylamino-2,3-propanediol, dioctyl ethanolamine, and homologues thereof.

The amines are thus preferably aliphatic, especially alkyl and alkanol, carbocyclic, and heterocyclic amines. The preferred tertiary amines are further preferably at least mono-alkyl N-substituted, and may contain one or more alkanol, including alkanediol, groups.

The proportion of the amine employed relative to the vinyl-aromatic resin reactant having haloalkyl radicals attached to its aromatic nuclei, should be such that there is present in the reaction mixture at least one molecular proportion of the amine for each haloalkyl radical in the vinyl-aromatic resin. The amine may be used in excess of the minimum proportion just stated. Usually, from one to three molecular proportions of the amine are used per haloalkyl radical in the vinyl-aromatic resin.

The amination, i.e., the reaction of the amine with the vinyl-aromatic resin having haloalkyl radicals attached to its aromatic nuclei, may be carried out at temperatures of from 20° to 150° C., preferably from 20° to 100° C. in the presence or absence of a dispersing medium and at atmospheric, subatmospheric or superatmospheric pressure. The reaction in usually carried out by dispersing the granular vinyl-aromatic resin having haloalkyl radicals attached to its nuclei in a mixture of the amine and a liquid such as water, acetone, ethyl alcohol, etc., and heating the mixture to a temperature of from 70° to 100° C. for a period of 2 to 6 hours or longer, or reacting at room temperature.

It is often desirable to include a catalyst for the reaction, among which are cupric iodide, potassium bromide, calcium iodide, cuprous chloride, and potassium, iodide, but a catalyst is not reqirred.

The reaction product, e.g., the anion exchange resin, is separated from the reaction mixture, e.g., by filtering, and is washed with water, or preferably washed with an organic liquid such as acetone, ethyl alcohol or dioxane, then washed with water to remove any soluble components, e.g., unreacted amine.

The following examples are furnished to illustrate the invention, and it will be understood that the invention is not limited to the components, proportions, conditions and procedures set forth therein. Unless otherwise stated, the proportions are by weight.

EXAMPLE 1

In preparing an anion exchange resin by the preferred method, 82 grams of styrene are copolymerized with 56 grams of 50% divinylbenzene, to produce a resin containing about 20% of divinylbenzene. The balance of the divinylbenzene composition, a commercially available material, is substantially ethylvinylbenzene, and there may be a small quantity of diethylbenzene. The latter is inert in the reaction and will function with the other organic solvent employed. The mixture of monomers is dissolved in 260 grams of toluene. The toluene proportion is 65% by weight of the solution.

3,600 grams of water are placed in a flask and heated to 70° C. 40 grams of starch is made into a thick paste in 80 ml. of water and added to the flask, followed by agitation. 2 grams of benzoyl peroxide is added to the monomer solution, and the solution is added to the flask.

The temperature is maintained at 74° C. for six hours with agitation, to form spheroids. After the spheroids harden, the temperature is raised to 84° C. and maintained for an additional eighteen hours.

The reaction mixture is cooled and the water layer removed. The beads are washed with water, separated by filtration, and washed with water followed by 200 ml. of acetone to remove some of the adhering toluene. The beads are then air dried.

25 grams of the beads and 100 ml. of chloromethyl methyl ether are placed in a flask and allowed to stand one hour, until the beads are completely swelled. The mixture is brought to a gentle reflux. 20 grams of anhydrous aluminum chloride is mixed with 50 ml. of chloromethyl methyl ether, carefully with cooling. The dissolved catalyst is added to the flask slowly over a twenty minute period. Refluxing is continued for an additional five hours. Then, the flask and contents are cooled, and the reaction mixture is poured into 800 ml. of water and 20 grams of ice. The beads are separated by filtration and washed with water followed by acetone, water, and methanol.

The chloromethylated beads are placed in a flask with 125 ml. of 25% by weight aqueous trimethylamine. The mixture is stirred occasionally for several hours at room temperature and then allowed to stand for about twenty-four hours or longer at room temperature.

The beads are separated by filtration and washed with water followed by methanol. The product is the desired quaternary ammonium resin.

EXAMPLE 2

In another method of producing an anion exchange resin, a 20% cross-linked resin is produced from 27 grams of styrene and 18 grams of the 50% divinylbenzene. The monomers are dissolved in 55 grams of toluene, representing a toluene proportion of 55%. 0.5 gram of benzoyl peroxide is added to the solution. The monomer solution is polymerized in 900 grams of water containing 10 grams of starch, in the manner described in Example 1.

29 grams of the copolymer beads are chloromethylated in 100 grams of chloromethyl methyl ether, employing 15 grams of zinc chloride catalyst. The reaction takes place at room temperature, allowing the mixture to stand for twenty-four hours.

The product is aminated with 100 grams of 25% trimethylamine in the manner described in Example 1, to produce a quaternary ammonium resin.

EXAMPLE 3

In the manner described in Example 1 or Example 2, a number of anion exchange resins were produced according to the invention. The results are tabulated in the table which follows.

In the table, DVB refers to divinylbenzene, W.H.C. refers to water holding capacity, R.T. means room temperature, and the descriptions of the remaining results correspond to the conditions previously described.

The table illustrates both the excellent results achieved in the invention and also conditions which produce resins of lesser importance. It will be observed that very good resins are produced employing about 55% to 65% of solvent commencing at 20% divinylbenzene. Other conditions nevertheless produce resins which have utility.

It will be noted that the water holding capacity increases with increasing solvent proportion. It will also be noted that the volume changes are reduced by the preferred chloromethylation at reflux temperature. The solvents vary somewhat in the results produced; for example, benzene provides a relatively low water holding capacity. With ethylene dichloride, a greater proportion of divinylbenzene is required to produce the desired low volume changes.

TABLE

| Number | Solvent | Percent solvent | Percent DVB in polymer | Chloromethylation | Percent W.H.C. | Percent swelling | Percent shrinkage | Compression |
|---|---|---|---|---|---|---|---|---|
| 585 | Toluene | 40 | 16 | $ZnCl_2$ at R.T. | 46.6 | 27.4 | 5.5 | 32.6 |
| 597 | do | 55 | 20 | $ZnCl_2$ at R.T. | 53.8 | 39.6 | 2.9 | 42.5 |
| 25 | do | 55 | 20 | $AlCl_3$ at R.T. | 52.0 | 23.9 | 3.6 | 27.5 |
| 26 | do | 55 | 20 | $AlCl_3$ plus $ZnCl_2$ R.T. | 52.6 | 21.0 | 3.6 | 24.6 |
| 38 | do | 55 | 20 | $AlCl_3$ at reflux | 53.7 | 18.3 | 3.7 | 22.0 |
| 39 | do | 55 | 20 | $SnCl_4$ at reflux | 54.3 | 17.6 | 5.1 | 22.7 |
| 43 | do | 55 | 20 | $AlCl_3$ at reflux | 53.5 | 13.6 | 2.9 | 16.5 |
| 52 | do | 60 | 20 | $AlCl_3$ at reflux | 56.0 | 17.9 | 2.7 | 20.9 |
| 53 | do | 65 | 20 | $AlCl_3$ at reflux | 62.2 | 16.1 | 3.1 | 19.2 |
| 58 | do | 50 | 40 | $AlCl_3$ at reflux | 49.4 | 7.1 | 1.0 | 8.1 |
| 590 | Chlorobenzene | 40 | 12 | $ZnCl_2$ at R.T. | 47.4 | 32.9 | 3.6 | 36.5 |
| 587 | do | 40 | 16 | $ZnCl_2$ at R.T. | 45.0 | 31.0 | 5.0 | 36.0 |
| 596 | Benzene | 40 | 16 | $ZnCl_2$ at R.T. | 38.8 | 30.1 | 2.1 | 32.2 |
| 598 | Ethylene dichloride | 40 | 16 | $ZnCl_2$ at R.T. | 42.3 | 34.0 | 1.4 | 35.4 |
| 8 | Xylene | 40 | 20 | $AlCl_3$ at R.T. | 40.1 | 26.0 | 2.1 | 28.1 |
| 9 | do | 50 | 20 | $AlCl_3$ at R.T. | 44.9 | 23.1 | 2.8 | 25.9 |

When resins produced according to the invention were comparatively tested with a number of commercial anion exchange resins having comparable water holding capacities, it was found that the physical stability of the new resins was superior. The swelling and shrinking properties were the lowest of all of the resins tested, and for the most part, much lower. The new resin beads were free from cracks and showed very little physical deterioration under the most severe conditions. They were well suited for various commercial uses. Preferred resins were prepared in the manner of Nos. 52 and 53 given in the above table.

The invention thus provides a substantially improved new process for the production of ion exchange resin particles. The resin particles are characterized by low volume changes while having good water holding capacities. Prior problems in the production of porous ion exchange resins have been overcome.

We claim:

1. A process for producing copolymers of increased porosity which comprises:
   (A) dissolving from 50 to 88% by weight of a monovinyl aromatic monomer and from 12 to 50% of a polyvinyl aromatic monomer in an inert organic liquid which is a solvent for the monomers but is a nonsolvent for the polymerized product of the monovinyl and polyvinyl monomers, said solvent being present in an amount of about 30 to 70% by weight based on the weight of solution;
   (B) incorporating said solution into an excess of water to form a dispersion of droplets; and
   (C) copolymerizing said monovinyl and said polyvinyl monomers while suspended in said aqueous medium and in the presence of said inert organic liquid.

2. A process for producing copolymers of increased porosity which comprises:
   (A) dissolving from 50 to 84% by weight of a monovinyl aromatic monomer and from 16 to 50% of a polyvinyl aromatic monomer in an inert organic liquid which is a solvent for the monomers but is a nonsolvent for the polymerized product of the monovinyl and polyvinyl monomers, said solvent being present in an amount of about 40 to 65% by weight based on the weight of solution;
   (B) incorporating said solution into an excess of water to form a dispersion of droplets; and
   (C) copolymerizing said monovinyl and said polyvinyl monomers while suspended in said aqueous medium and in the presence of said inert organic liquid.

3. A process for producing copolymers of increased porosity which process comprises:
   (A) dissolving from 50 to 84% by weight of styrene and from 16 to 50% by weight of divinyl benzene in an inert organic liquid which is a solvent for the monomers but is a nonsolvent for the polymerized product of styrene and divinyl benzene, said solvent being present in an amount of about 30 to 70% by weight based on the weight of solution;
   (B) incorporating said solution into an excess of water to form a dispersion of droplets; and
   (C) copolymerizing said styrene and said divinyl benzene while suspended in said aqueous medium and in the presence of said inert organic liquid.

4. A process for producing copolymers of increased porosity which process comprises:
   (A) dissolving from 50 to 84% by weight of styrene and from 16 to 50% by weight of divinyl benzene in an inert organic liquid which is a solvent for the monomers but is a nonsolvent for the polymerized product of styrene and divinyl benzene, said solvent being present in an amount of about 40 to 65% by weight based on the weight of solution;

(B) incorporating said solution into an excess of water to form a dispersion of droplets; and (C) copolymerizing said styrene and said divinyl benzene while suspended in said aqueous medium and in the presence of said inert organic liquid.

5. A process for the production of a copolymer of an aromatic vinyl monomer and an aromatic divinyl monomer which comprises: dispersing in water, as a dispersion of droplets, a solution in a water-immiscible, liquid solvent selected from the group consisting of benzene, lower alkyl benzene, chlorobenzene, bromobenzene, ethylene dichloride and ethylene dibromide of a mixture of said monomers in a weight proportion of about 12% to 50% of said divinyl monomer and with the balance being said monovinyl monomer, in which solution said solvent constitutes about 30% to 70% by weight based on the weight of said monomers plus said solvent, and copolymerizing said monomers in said dispersion.

6. A process for the production of a copolymer of an aromatic vinyl monomer and an aromatic divinyl monomer which comprises: dispersing in water, as a dispersion of droplets, a solution in a water-immiscible, liquid solvent selected from the group consisting of benzene, lower alkyl benzene, chlorobenzene, bromobenzene, ethylene dichloride and ethylene dibromide of a mixture of said monomers in a weight proportion of about 20% to 40% of said divinyl monomer and with the balance being said monovinyl monomer, in which solution said solvent constitutes about 30% to 70% by weight based on the weight of said monomers plus said solvent, and copolymerizing said monomers in said dispersion.

7. A process for the production of a copolymer of a monovinyl benzenoid monomer and a divinyl benzenoid monomer which comprises: dispersing in water, as a dispersion of droplets, a solution in a water-immiscible, liquid solvent selected from the group consisting of benzene, lower alkyl benzene, chlorobenzene, bromobenzene, ethylene dichloride and ethylene dibromide of a mixture of said monomers in a weight proportion of about 20% to 40% of said divinyl monomer and with the balance being said monovinyl monomer, in which solution said solvent constitutes about 30% to 70% by weight based on the weight of said monomers plus said solvent, and copolymerizing said monomers in said dispersion.

8. The process of claim 7 wherein said solvent is toluene.

9. A process for the production of a copolymer of a styrene monomer and a divinyl benzene monomer which comprises: dispersing in water, as a dispersion of droplets, a solution in a water-immiscible, liquid solvent selected from the group consisting of benzene, lower alkyl benzene, chlorobenzene, bromobenzene, ethylene dichloride and ethylene dibromide of a mixture of said monomers in a weight proportion of about 20% to 40% of said divinyl benzene monomer and with the balance being said styrene monomer, in which solution said solvent constitutes about 30% to 70% by weight based on the weight of said monomers plus said solvent, and copolymerizing said monomers in said dispersion.

10. A process for producing a quaternary ammonium ion exchange resin which comprises chloromethylating a copolymer produced in accordance with the process of claim 7 with chloromethyl methyl ether at about reflux temperature in the presence of a Friedel-Crafts catalyst until said copolymer contains an average of 0.8 to 1.2 chloromethyl groups per aromatic nucleus of said copolymer, and thereafter quaternizing the chloromethyl groups of said copolymer with a tertiary amine.

11. A process for producing solid vinylaromatic copolymer beads suitable for preparation of ion-exchange resin beads characterized by increased porosity and reduced swelling and shrinkage in use which comprises:

(A) dissolving a monovinyl aromatic monomer and a polyvinyl aromatic monomer in an inert organic liquid which is a solvent for the monomers but is a nonsolvent for the polymerized product of the monovinyl and polyvinyl monomers, said solvent being present in an amount of about 30 to 70% by weight based on the weight of solution:

(B) suspending the monomer solution as dispersed droplets in an aqueous dispersion medium; and (C) copolymerizing said monomers in aqueous dispersion to form solid copolymer beads which upon chloromethylation to give an average of from 0.8 to 1.2 chloromethyl groups per aromatic nucleus and subsequent amination with trimethylamine yield trimethyl quaternary ammonium anion-exchange resins characterized in chloride form by:

(1) a water holding capacity of from 40 to 65 weight percent;
(2) a volume expansion on conversion into hydroxide form of less than 30 percent; and
(3) a volume contraction on equilibration in 1 N aqueous NaCl of less than 10 percent.

12. The process of claim 11 wherein the aromatic monomers are styrene and divinylbenzene.

13. A process for producing anion-exchange resins which comprises: chloromethylating a vinyl aromatic copolymer produced by the process of claim 11 to give an average of from 0.8 to 1.2 chloromethyl groups per aromatic nucleus, and thereafter aminating the chloromethylated copolymer to give an anion-exchange resin.

14. The process of claim 13 wherein the chloromethylated copolymer is aminated with trimethylamine to give a quaternary ammonium anion-exchange resin characterized in chloride form by:

(1) a water holding capacity of from 40 to 65 weight percent;
(2) a volume expansion on conversion into hydroxide form of less than 30 percent; and
(3) a volume contraction on equilibration in 1 N aqueous NaCl of less than 10 percent.

15. The solid vinyl aromatic copolymer beads prepared by the process of claim 11.

16. A solid anion-exchange resin prepared by the process of claim 13.

References Cited

UNITED STATES PATENTS

| | | | |
|---|---|---|---|
| 2,591,574 | 4/1952 | McBurney | 260—2.1 |
| 2,800,445 | 7/1957 | Clarke | 260—2.1 |

HAROLD D. ANDERSON, Primary Examiner

U.S. Cl. X.R.

260—2.5, 17, 17.4, 29.6, 88.2

UNITED STATES PATENT AND TRADEMARK OFFICE
Certificate
Patent No. 3,549,562 Patented December 22, 1970
Morris Mindick and Jerry J. Svarz Application having been made by Morris Mindick and Jerry J. Svarz, the inventors named in the patent above identified, and The Dow Chemical Company, a corporation of Delaware, the assignee, for the issuance of a certificate under the provisions of Title 35, Section 256, of the United States Code, adding the name of Richard Y. Wen as a joint inventor, and a showing and proof of facts satisfying the requirements of the said section having been submitted, it is this 10th day of January 1978, certified that the name of the said Richard Y. Wen is hereby added to the said patent as a joint inventor with the said Morris Mindick and Jerry J. Svarz.

FRED W. SHERLING,
*Associate Solicitor.*